Dec. 18, 1962  A. K. ANANDER  3,068,749
PHOTOMECHANICAL CAMERA

Filed Feb. 19, 1959

INVENTOR:
ANDREW K. ANANDER

BY
*Morgan, Finnegan, Durham & Pine*

ATTORNEYS

Dec. 18, 1962     A. K. ANANDER     3,068,749
PHOTOMECHANICAL CAMERA
Filed Feb. 19, 1959     2 Sheets-Sheet 2
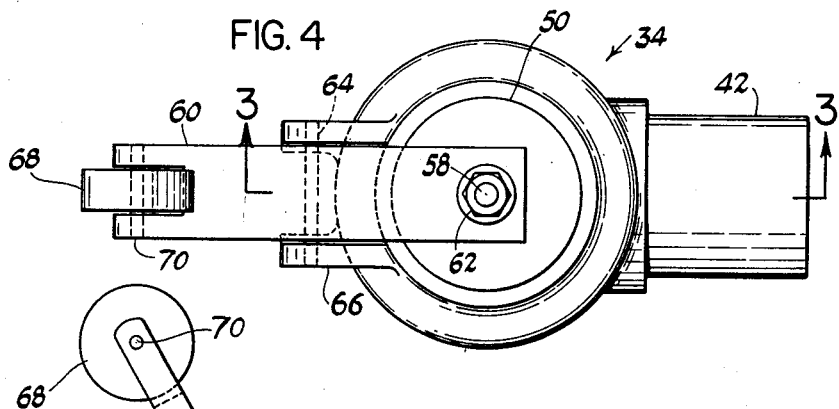
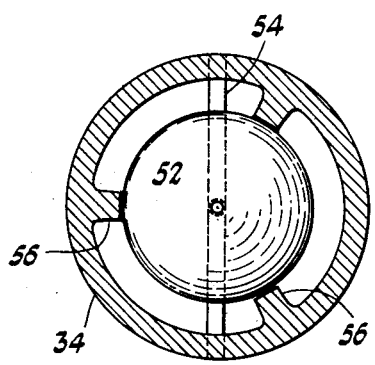
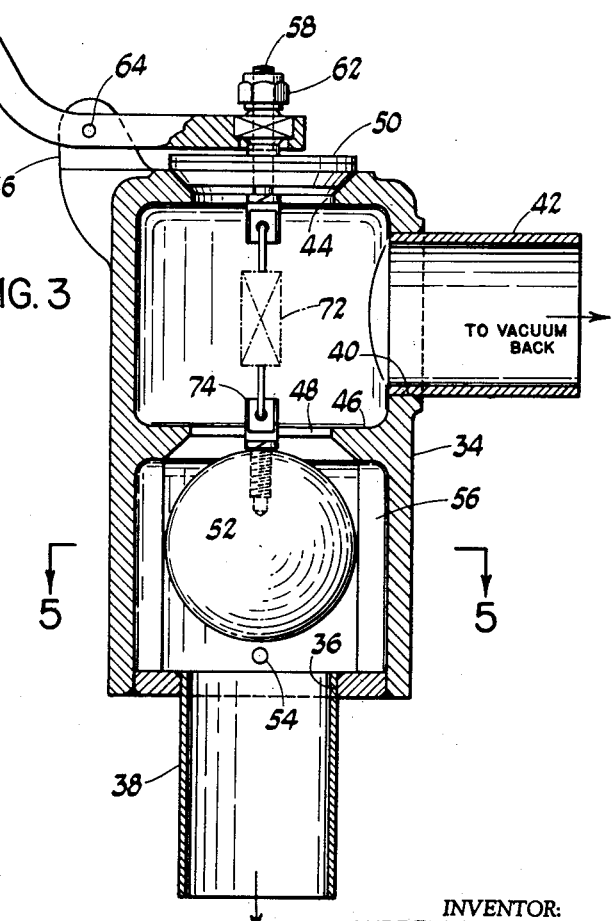
INVENTOR:
ANDREW K. ANANDER
BY
ATTORNEYS

United States Patent Office 3,068,749
Patented Dec. 18, 1962

3,068,749
PHOTOMECHANICAL CAMERA
Andrew K. Anander, Glen Cove, N.Y., assignor to Powers Chemco, Inc., Glen Cove, N.Y., a body corporate of New York
Filed Feb. 19, 1959, Ser. No. 794,367
4 Claims. (Cl. 88—24)

This invention relates generally to photomechanical process cameras and has particular relation to an improved camera of this type employing a vacuum back or board against which the photosensitive material is held by suction in flat overlying relation with the face of the board in the focal plane of the camera during exposure.

Objects and advantages of the invention will be obvious herefrom, or may be learned by practice with the invention, the same being realized and attained by means of the instrumentalities and combinations pointed out in the appended claims.

In photomechanical process cameras employing vacuum backs or boards the necessary suction for retaining the photosensitive material against the face of the board is produced by a vacuum pump. This vacuum producing source is generally of a substantial size so that it has considerable inertia and when the pump drive is shut off or deactivated the pump takes some time to coast to a stop with this time being as much as ten seconds on large cameras and with a camera having a three quarter horse power turbine in its vacuum source a six second coasting period is required after shutoff before no vacuum is any longer developed. This time lapse slows down the camera operator since the photosensitive material drops from the face of the vacuum board by gravity and accordingly it will be held against the board until the pump stops developing a vacuum so that suction is no longer applied to the photosensitive material.

The present invention obviates this difficulty by immediately relieving the vacuum in the vacuum back or board upon moving the board back from the focal plane of the camera after exposure with this moving of the board being one of the usual operating steps of the camera.

Accordingly it is an object of this invention to provide an improved photomechanical process camera employing a vacuum board for maintaining the film in the focal plane of the camera during exposure with the vacuum being released from the board promptly after exposure notwithstanding that the vacuum source or pump requires a considerable time to coast to a stop. Another object is to provide such a photomechanical process camera with means that may be operated after exposure for venting the vacuum board to atmosphere and simultaneously preventing communication of the board with the source of vacuum. Still another object is to provide such a photomechanical process camera wherein the venting of the vacuum board to atmosphere after exposure is accomplished through manipulation of a portion of the camera with this portion being the vacuum board and with the venting action being accomplished upon moving the board rearwardly for gravity dropping of the photosensitive material from the face of the board. Still another object is to provide such a photomechanical process camera wherein vacuum is automatically released from the vacuum board and communication of the board with the vacuum source is interrupted promptly upon moving the board rearwardly with the organization being simple but reliable and effective in operation.

In accordance with the present invention there is provided a photomechanical camera which includes a vacuum back or board which may be of known construction as for example that shown in my co-pending application, Serial No. 466,509, filed Nov. 3, 1954. This board includes a manifold which is connected to a source of suction or vacuum and the front of the board provides a flat preforate surface with suction being applied through the openings in the surface from this manifold and with the photosensitive material being held in flat, smooth, overlying relation with this surface by means of the suction applied through these openings. The vacuum board is pivotally mounted within the camera for pivotal movement rearwardly out of the camera's focal plane to a position for dropping of the photosensitive sheet from the face of the board by gravity.

The vacuum pump upon being shut off takes some time to coast to a stop so that suction is no longer applied to the manifold of the vacuum board and accordingly in the connection of the vacuum board with this pump there is provided means for automatically venting the manifold of the vacuum board to atmosphere and interrupting communication of the vacuum board with the pump upon pivoting the board to its rearward or film-dropping position. As illustratively disclosed this means takes the form of a multiple valve arrangement which has an actuating means that engages a portion of the camera upon pivoting the vacuum board rearwardly as aforesaid. This multiple valve includes a valve that controls a valve port leading to atmosphere and another valve that includes a valve port that leads from the manifold to the suction source or vacuum pump. The actuator for these valves is a common actuator and the valves are normally urged into a position such that the port leading to atmosphere is closed and the port leading to the vacuum pump is open so that suction may be applied to the manifold of the board. Upon rearward movement of the vacuum board the actuator engages a portion of the camera and opens the port to atmosphere while closing the port leading to the vacuum pump. The connection between the actuator and the valve controlling the port leading to the vacuum pump is a resilient connection permitting movement of the actuator even after the valve associated with this port is closed, thereby permitting relatively free pivotal movement of the vacuum board and also doing away with the requirement that there be any precise adjustment of the actuator or the valve arrangement.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

In the drawings:

FIGURE 3 is a fragmentary vertical sectional view of the multiple valve which forms part of the present invention;

FIGURE 4 is a top plan view of the valve shown in FIGURE 3; and,

FIGURE 5 is a transverse sectional view of the valve organization taken along line 5—5 of FIGURE 3.

Figure 1:
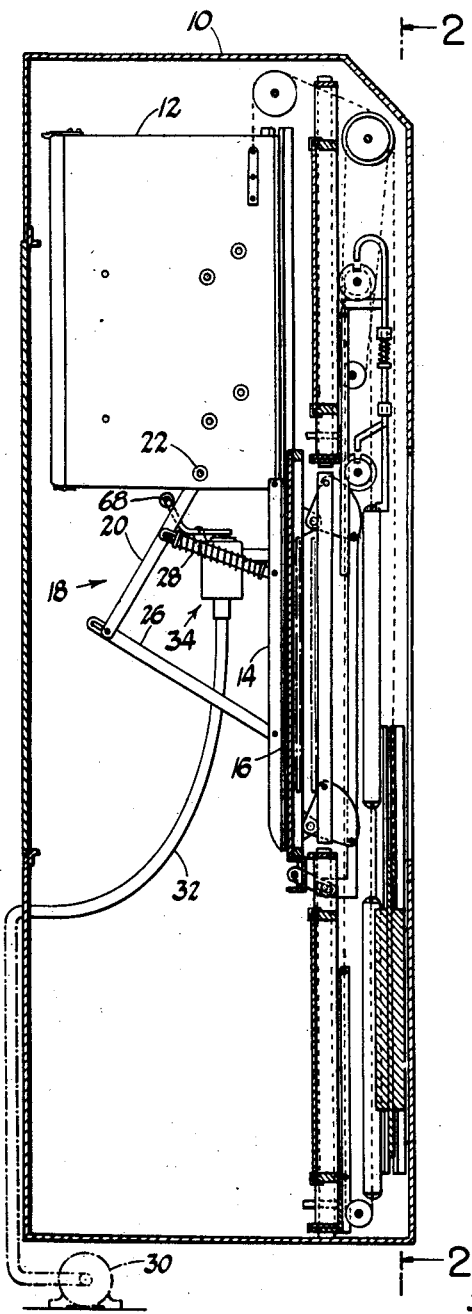
FIGURE 1 is a vertical sectional view of a photo-mechanical process camera embodying the present invention with the vacuum board shown in this view being in its forward position where the photosensitive material on the face of the board lies within the focal plane of the camera.

Referring now to the drawings, wherein like reference characters are used throughout to designate like elements, the illustrative and preferred embodiment of the invention depicted therein includes a light-tight housing 10 which encloses the various necessary elements that make up the rear portion of the photomechanical process camera of the invention. Within this housing is mounted the box or container 12 which holds rolls of various kinds of sensitized paper that are to be used with the camera. Pivotally mounted to the container and positioned immediately therebelow is vacuum board 14. This board has a flat front face or surface 16 against which is held a sheet of sensitized paper. The portion of the vacuum board immediately to the rear of front face 16 comprises a distribution manifold to which suction is applied and face 16 has openings distributed generally uniformly throughout its area so that suction from the manifold is applied through these openings to the sheet of film thereby holding the film in firm engagement with the face of the vacuum board and assuring that the film is smooth and flat.

Figure 2:
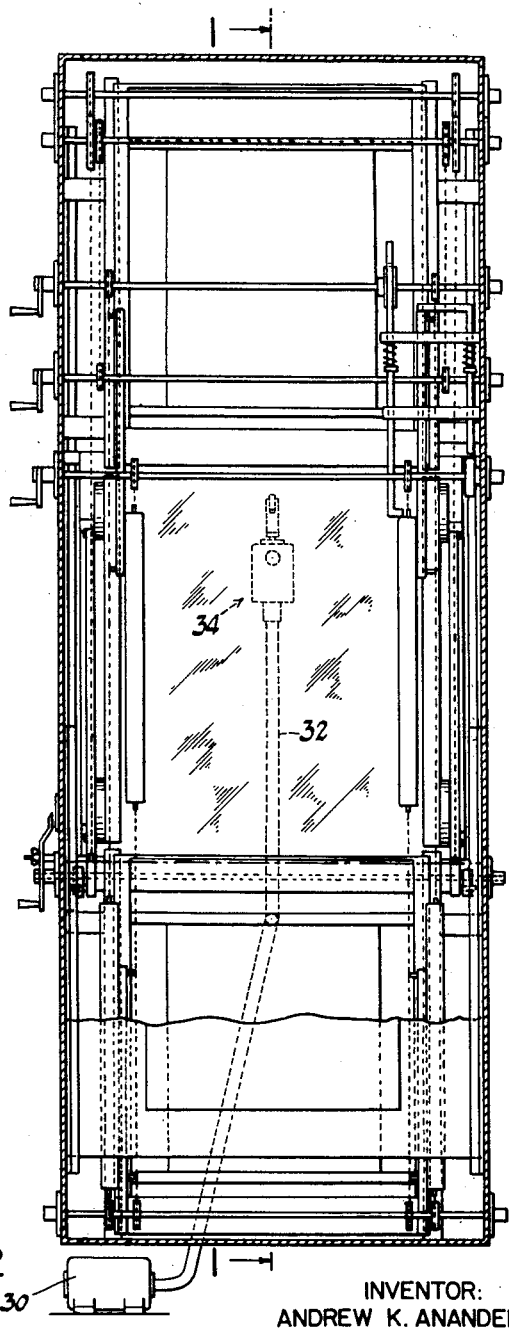
FIGURE 2 is a sectional view taken generally along line 2—2 of FIGURE 1.

As illustratively disclosed in FIGURES 1 and 2, vacuum board 14 is positioned so that its front face lies in the focal plane of the camera whereby film that is held in engagement with this front face is in position for exposure. In applying film to the face of the vacuum board it is unrolled from the desired roll in box 12 down over the face of the board to the extent desired and then by means of a running knife at the lower portion of box 12 is cut off with the sheet of film then overlying perforate front face 16, being held there again by means of suction as previously brought out.

The mechanism positioned in front of vacuum board 14 comprises means for storing and manipulating various screens as for example screens to produce halftones and lined negatives with this mechanism forming no particular part of the present invention and since it is of known construction and is described in detail in U.S. Patent No. 2,115,233 issued April 26, 1938, to F. P. Powers it is not described herein.

Support for vacuum board 14 is derived from the linkage identified generally as 18 with there being one such linkage at each side of the vacuum board and accordingly at each side of container 12. The linkage 18 includes link 20 keyed to shaft 22 and links 26 and 28 extending between link 20 and the vacuum board and pivoted to these members as shown. Thus rotation of shaft 22 pivots the vacuum board about the axis of this shaft and accordingly moves the board to and from the focal plane of the camera with shaft 22 extending to the exterior of housing 10 in order that it may be manipulated and the vacuum board moved rearwardly out of the focal plane of the camera and forwardly into its forward position for exposure without it being necessary to gain access to the interior of the housing.

Suction is applied to the vacuum back by means of a motor driven suction pump 30 with this pump communicating with the vacuum board through the flexible conduit or tube 32. Suction pump 30 requires a substantial time to come to a stop after being shut off, as for example six to ten seconds, and therefore in order to relieve the vacuum board of suction promptly after exposure of the film so that the film will drop from the face of the board there is interposed in the connection with the vacuum pump a vacuum breaker which is effective to vent the vacuum board to atmosphere and interrupt communication of the board with the vacuum pump. As embodied, this is accomplished by means of the multiple valve organization identified in FIGURES 1 and 2 generally as 34. This valve organization 34 is mounted on the back of the vacuum board 14 and accordingly is movable with the board. This vacuum breaker organization includes valve housing 34 which has an opening 36 in its lower end from which extends tube 38 that is connected with flexible conduit 32. Adjacent the upper end of housing 34 is provided lateral opening 40 from which extends tube 42 with this tube being received and secured within a suitable opening formed in the back of the vacuum board. At the upper end of housing 34 is provided port 44 which leads to atmosphere and generally centrally within this valve housing is partition 46 which is provided with port 48.

These last named ports, i.e. 44 and 48, are formed to provide valve seats with valve 50 being adapted to engage the seat formed by port 44 and ball valve 52 being adapted to engage the seat formed by port 48. This ball valve is mounted within the chamber formed in the valve housing below partition 46 with the valve being guided to and from engagement with the seat of port 48 and the stop pin 54 by means of the radially extending ribs 56 formed on the wall of housing 34. Extending through and secured to valve 50 is stem 58 with this stem extending through the horizontal leg of actuating lever 60 and having nut 62 threadedly received on its upper end. The stem is received in the actuating lever in a manner such that limited universal movement of the stem with relation to the lever may be had but as the lever is pivoted about pin 64 the stem will move upward and raise valve 50 from its seat. This pin 54 extends through a suitable bore provided in lever 60 and is secured within upstanding ears 66 on housing 34 and between which the actuating lever is received. The upper end of lever 60 is bifurcated as shown in FIGURE 4 and mounted between the legs of this bifurcate is roller 68 with this roller being journaled to pin 70. Ball valve 52 is connected with the lower end of stem 58 by means of spring 72 with the lower end of this spring being secured to the upper end of stud 74 which is in turn secured to the ball valve.

This multiple valve organization 34 is arranged so that valve 50 is biased by gravity to close port 44 with valve 52 being biased to its opened position or in other words the elements of the valve organization are urged in their relative positions as disclosed in FIGURE 3 and when vacuum board 14 is moved to its forward position where the face of the board lies in the focal plane of the camera the valve elements occupy this position. It will be noted that the application of suction from pump 30 to the vacuum board will also urge the elements of the valve organization in the position shown in FIGURE 3. When the vacuum board is in its forward position roller 68 is spaced just below the bottom of container 12, with this relationship being shown in FIGURE 1. Thus upon pivoting the vacuum board about shaft 22 from its forward position to its rearward position where the exposed film sheet drops from the face of the board, roller 68 contacts the bottom of container 12 pivots actuating lever 60 about pin 64, causing valve 50 to open and vent the vacuum board to atmosphere and causing valve 52 to close and thereby interrupt communication of the vacuum board with the vacuum pump. The interconnecting spring 72 permits board 14 to be pivoted further rearwardly even after valve 50 is moved to its closed position so that the valve organization does not limit the pivotal movement of the vacuum board and the ball valve 52 may be moved to its closed position during the initial or first part of the rearward movement of the vacuum board. Furthermore, with this spring connection the necessity for accurate adjustment and positioning of the valve organization is made less critical.

It will be seen that with the organization of this invention after exposure of the film the suction that held the film against the face of the vacuum board will be quickly relieved upon the usual pivotal movement of the vacuum board from the exposure position to the rearward position where the film drops by gravity from the board with it not being required to wait for the vacuum pump to coast to a stop and with the operation of the camera thereby being improved.

The invention in its broader aspects is not limited to the specific mechanism shown and described but departures may be made therefrom, within the scope of the accompanying claims, without departing from the principles of the invention and without sacrificing its chief advantages.

What is claimed is:

1. A vacuum board for use in a photomechanical process camera for retaining photosensitive film thereagainst for exposure comprising means mounting said board for movement into and out of exposure position, means for applying suction to said board, a valve, said valve having a portion thereof connected to said suction means, another portion thereof open to the atmosphere and a third portion thereof connected to said board, said valve including valve seats normally closing the opening of said valve to atmosphere and normally opening said valve for connecting said suction means to said board, means interconnecting said valve seats for synchronous movement, an actuating arm, means connecting one end of said actuating arm to the valve seat connecting means, and means mounting said actuating arm with the other end thereof positioned in the path of travel of said board to and from exposure position, said actuating arm being operative to move said valve seats out of normal position, venting said vacuum board to atmosphere through said valve and closing said suction to said board as said board is moved out of exposure position.

2. The invention as defined in claim 1 wherein said actuating arm is operative to vent said board for releasing said photosensitive film substantially concomitantly with the movement of said board out of exposure position.

3. The invention as defined in claim 1 wherein said board is pivotally mounted for rotation into and out of exposure position and wherein said actuating arm is mounted in spaced relationship with the bottom portion of said board for engagement therewith as said board is pivoted out of exposure position.

4. A vacuum board for use in a photomechanical process camera for retaining photosensitive film thereagainst for exposure comprising means mounting said board for movement into and out of exposure position, means for applying suction to said board and against said photosensitive film, a vent to atmosphere for said board to relieve said suction, a valve, means interconnecting said valve with said suction means, said vent and said board, said valve normally connecting said board to said suction means, and an operating arm for said valve having a portion thereof positioned in the path of travel of said board for interrupting the valve connection between said suction means and said board and concomitantly connecting said vent and said board through said valve to vent said board to atmosphere and release said film at the start of movement of said board out of exposure position.

References Cited in the file of this patent

UNITED STATES PATENTS

| | | |
|---|---|---|
| 1,865,262 | Koppe | June 28, 1932 |
| 2,287,271 | Powers | June 23, 1942 |
| 2,301,239 | Arndt | Nov. 10, 1942 |
| 2,374,469 | Wekeman | Apr. 24, 1945 |
| 2,826,976 | Gelb | Mar. 18, 1958 |
| 2,869,447 | Young Berg | Jan. 20, 1959 |

FOREIGN PATENTS

| | | |
|---|---|---|
| 519,593 | Germany | Mar. 9, 1931 |